Jan. 17, 1961     H. DOBBERSTEIN     2,968,736
CYCLING MECHANISM FOR PHOTOELECTRICAL DEVICES
Filed July 1, 1958     2 Sheets-Sheet 1
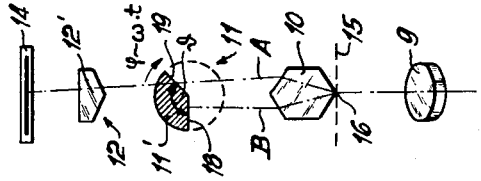
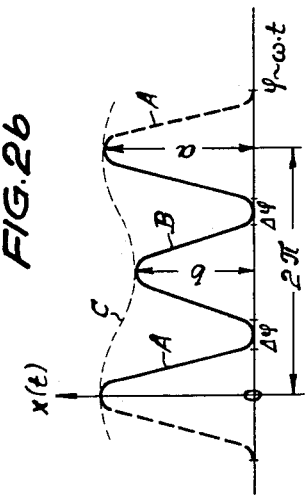
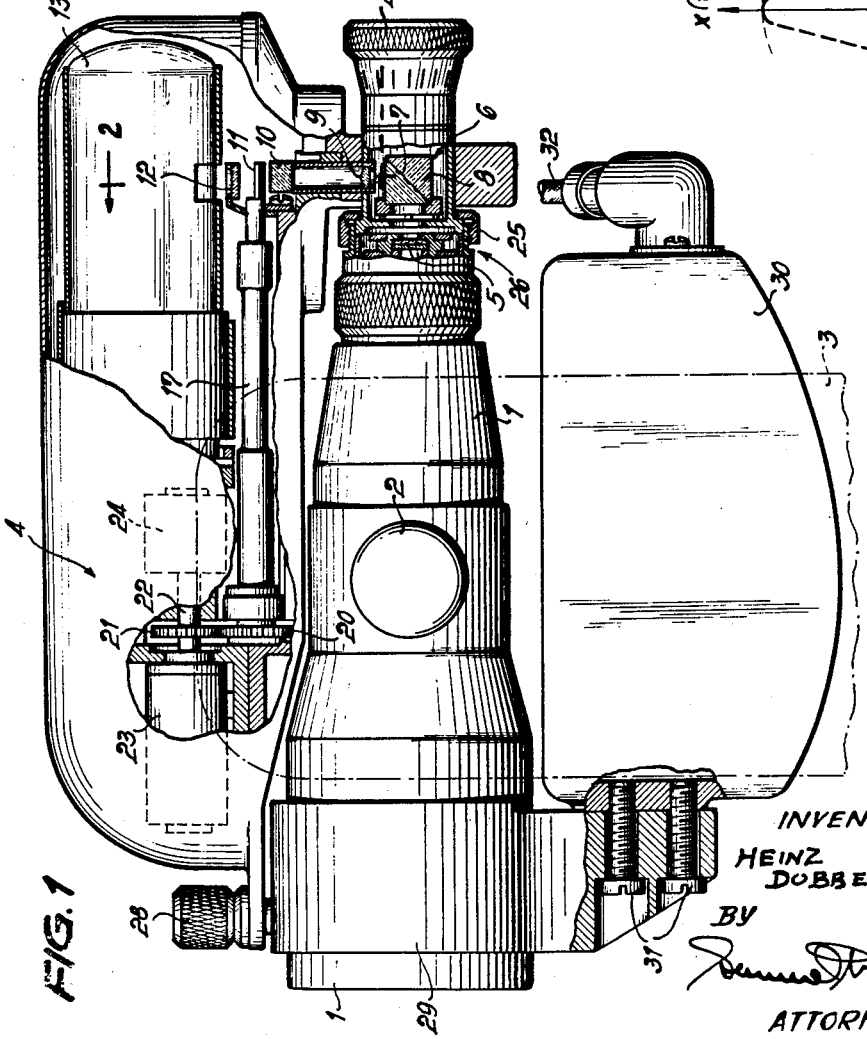
INVENTOR
HEINZ DOBBERSTEIN
BY
ATTORNEY

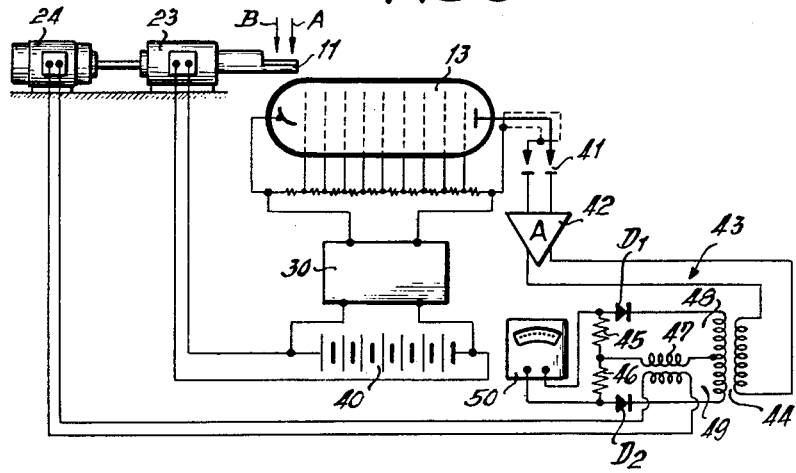
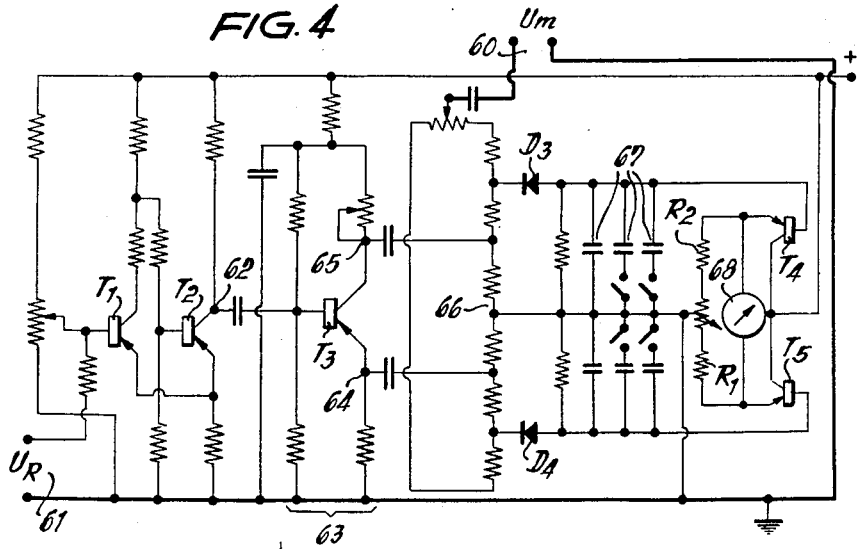
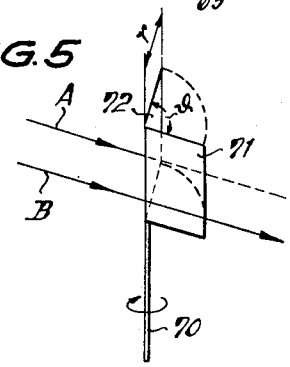
INVENTOR
HEINZ DOBBERSTEIN
ATTORNEY

United States Patent Office
2,968,736
Patented Jan. 17, 1961

2,968,736
CYCLING MECHANISM FOR PHOTOELECTRICAL DEVICES

Heinz Dobberstein, Berlin-Neukoelln, Germany, assignor to Askania-Werke A.G., Berlin-Friedenau, Germany, a corporation of Germany Filed July 1, 1958, Ser. No. 745,978

Claims priority, application Germany July 2, 1957

4 Claims. (Cl. 250—233)

This invention relates to devices for photoelectrically comparing light flux intensities or related characteristics by cyclically alternating exposure of different fluxes and electrical comparison thereof. It has to do particularly with the mechanism for cyclic alternation. For purposes of accurate measurements and comparisons, the programming and phasing of such mechanism has been found to be critical; and it is a basic object of the invention to improve such programming and phasing. Other objects are to minimize the first cost, the bulk, the inertial moment and the operating cost of the mechanism.

The new mechanism has utility for instance in target analyzing apparatus of the type wherein a light beam from a light source is split into a pair of beams which are photoelectrically compared by a single photo-tube in rapid cycles, for automatically deriving signals which may be utilized for instance to keep the apparatus trained or "clamped" to the target. It has been determined that in such apparatus, as built up to now, the cycling mechanisms operated in significantly less precise ways than did the other elements. The invention provides a system which eliminates this defect, thereby adding to the overall efficiency of the apparatus.

A characteristic and important element of the new system may be briefly described as comprising a motor-driven rotary shutter in front of the single photo-tube used, said shutter being formed in essence by a system—desirably, a pair—of shutter surfaces, including a certain special angle and revolving about an axis transverse to the light beams to be compared.

Details of this element and of associated elements will best be explained in the description of preferred embodiments, which follows, and wherein the invention will be shown as applied for said purpose of keeping certain apparatus trained upon a target. In the drawing, Figure 1 is a side elevation, partly in section, of a theodolite incorporating the invention; Figure 2a is a schematic, enlarged section taken along line 2—2 in Figure 1; Figure 2b is a graph of flux measurements obtained by the apparatus. Figure 3 is a circuit diagram of the apparatus; Figure 4 is a modified circuit diagram; and Figure 5 is a schematic, perspective view of a modified shutter element.

Referring to Figure 1, a theodolite telescope 1 is mounted by horizontal bearings 2 on a housing 3 rotatable about a vertical axis. For automatically keeping a target in the sight of telescope 1 there is provided a photoelectrical device 4 including a phototube 13, which is focussed on the image plane 5 of the telescope via reflector 6. The reflector advantageously comprises an interference mirror, disposed on a diagonal surface 7 of cubic prism 8; and device 4 includes an optical imaging system 9 adjacent this prism, followed by an optical or physical image splitter element 10, which element contains an image splitting edge in the image plane of system 9.

According to the invention this image splitter in turn is followed by a special, motorized shutter 11 for cyclically stopping one, both, the other, and again both of the light beams formed by the image splitter. When exposed by this shutter, the light passes through a collector prism 12 into the photo-tube 13, desirably a secondary electron multiplier, which forms the principal part of the photoelectrical portion of the apparatus.

A side view of the aforementioned elements, from system 9 to the cathode or photosensitive element 14 of tube 13, appears in Figure 2a, wherein the rapidly rotating shutter 11 is shown in a position angularly shifted from that which it has in Figure 1, and of course in a different view; the shaded area 11' being a section through this shutter. The revolving shutter is shown in Figure 2a as being in process of cutting off the right-hand partial beam A, formed by image splitter 10, while still cutting off the left-hand beam B formed by said image splitter. Pursuant to further, clockwise rotation the shutter admits a pulse of light flux to cathode 14; then it again stops both partial beams; then it admits a pulse of light flux of the other beam; and so on. The successive pulses are likely to have different luminance values, until telescope 1 (Figure 1) has been precisely aimed at the target point, for the reason that the image of the target point, formed in plane 15 by element 9 (Figure 2a) is until then divided into unequal portions by splitting edge 16 of element 10. Accordingly cathode 14 receives successive pulses of different intensity. Each of said pulses causes electron emission which initially increases and terminally decays according to a known sub-cycle, established for tube 13; and while the equation or curve of such sub-cycle is somewhat dependent on factors such as operating temperature, voltage conditions etc., no inaccuracy is introduced by such factors, per se, as a single electronic tube and circuit is used. It has, however, been found to be necessary to provide a special mechanism 17 for shutter 11, in order to fully utilize the accuracy available from such a single tube and circuit (Figure 1).

This mechanism 17 comprises a shaft rigid with shutter 11 and extending transversely—desirably at right angles—to partial beams A and B (Figure 2a). The shutter itself comprises an opaque cylindrical sector coaxial with shaft 17 and having radial boundary surfaces 18, 19 including a sufficiently large angle ϑ to stop, cyclically, beam A, both beams, beam B, and again both beams (as separated at 11) for certain time intervals. The so established cycling program is among the prerequisites of maximum precision, along with other requirements such as those controlling the sensitive photo-electrical process. In order to illustrate the sensitivity of the entire operation it may be mentioned that it is necessary not only to direct both beams A and B into a single tube 13 but also to direct them as precisely as possible into a single and minute cathode area of this tube, for which purpose the cross-section of prism 12, shown in Figure 2a at 12', must be made with great accuracy.

Referring further to Figure 1, shaft 17 of rotary shutter 11 is connected by gear drive 20, 21 with the output shaft 22 of synchronous motor 23. This motor and shaft also drive a generator 24 for providing, in phase with the rotation of shutter 11, required energy for separating and manipulating signals produced by tube 13 on pulses A and B, as will be explained presently. The entire device 4, containing elements 9 to 24, is secured by an adaptor 25 to a screw-threaded end portion 26 of telescope 1, in lieu of an ordinary ocular; incidentally, interference mirror 7 allows direct viewing of the target without obstruction of the automatic process, for instance for approximate, preliminary aiming and focussing. Device 4 is additionally fastened by clamping means 28 to yoke 29, engaging telescope 1 and also carrying a housing 30 by means of holders 31. Housing 30 contains a power source for tube 13 and the circuit thereof, connected thereto by cable 32.

The manipulation of the signals produced by tube 13 can best be explained in connection with Figure 2b. This graph shows the signal voltages on the vertical axis x(t), while showing on the horizontal axis the rotary progress φ~ω.t of the shutter (also indicated in general in Figure 2a) and the corresponding time intervals. It is assumed that the telescope has not been accurately aimed at the target point yet; as a result the amplitudes of signal potential created by pulses A exceed those of pulses B (or vice versa of the misalignment of the telescope, relative to the target, be reversed). These amplitudes are shown at a and b, respectively. One complete cycle 2π of the cycling mechanism produces one complete pulse A and one complete pulse B; and, by the use of a suitably large angle ϑ (Figure 2a) an angular interval Δφ is interposed between every two successive pulses of signal voltage, during which interval both light streams are stopped and no significant signal voltage is created. During such cycle portions, accordingly, those electronic operations can be performed which are required for in-phase separation of signals A and B, by means of alternating voltages created by generator 24, and without distortion of signal A and/or B by confusion thereof with part of the other signal.

It will be understood that the showing of Figure 2b is purely schematic. No attempt has been made in this showing to indicate possible peculiarities of waveshape of signal potentials, as influenced by characteristics of tube 13, the geometry of shutter 11, and other factors. It is only intended to indicate the interposition of low-voltage or no-voltage intervals between pulses A and B or in other words, between maximum and minimum values of the average signal cycle C.

The interposition of such intervals is an important feature of this invention. Various shutter devices have been proposed and used in apparatus of the present type, with either oscillating or revolving motions but none of the prior shutter devices has allowed full utilization of available accuracy of the electronic system, as does the new revolving shutter; particularly not by means of such simplicity, compactness and economy as those described.

A simple circuit for deriving signal voltages A, B, (Figure 2b) from the system comprising shutter 11 and tube 13 (Figure 1) is shown in Figure 3. Power source 30 is here shown as including battery 40 which also serves to energize synchronous motor 23. Output 41 of secondary electron multiplier 13 furnishes a signal potential at a frequency corresponding with the cycling of shutter 11; and with corresponding frequency, an amplifier generally indicated at 42 amplifies said signal. Signals corresponding to successive light pulses are separated by phase discriminator 43, wherein the amplified signals pass through the primary coil of a transformer 44. The center-tapped, secondary coil of said transformer feeds a circuit containing, symmetrically with the two halves of said coil, resistors 45, 46. The centertap of transformer 44 forms a bridge connected between the resistors and including the secondary coil of a second transformer 47. The primary coil of said second transformer is energized by generator 24. Thus the signal created by shutter 11 and tube 13 and amplified by amplifier 42 is divided into a pair of signals, with a phase difference of 180 degrees; the reference voltage from 24 receives opposite signs to the two sides of transformer 47 (elements 48, 49); and upon rectification at D1, D2, a voltage is produced at the mutually remote terminals of resistors 45, 46, which corresponds to the difference between the amplitudes of the pulses from 13. This differential voltage—also corresponding to curve C in Figure 2b—can be measured at 50; and such measurement can be utilized by well-known means, not shown, for shifting telescope 1 for automatic aiming or the like.

It will be understood that the process of reversing the potentials furnished by the alternator 24 and impressed on the transformer 47 requires finite time intervals, as does indeed every modulation, oscillation or the like. It will further be understood that such time intervals can readily be caused, by suitable generator features, not shown, to coincide with the aforesaid low-signal or no-signal intervals of system 13, 42; or it may be preferred to utilize only portions of the light signal intervals for the interlacing of the reference cycle intervals. Still further, it will be noted that slight irregularities of the phase of reference signals from generator 24 will not disturb the measurement at 50.

A modified circuit is shown in Figure 4. Input 60 of this circuit receives the output of a transformer forming part of an amplifier similar to that shown in Figure 3 at 42, while the reference signal from generator 24 enters at 61. Said reference signal passes through an impulse former stage containing transistors T1, T2 for creating a square wave reference voltage. At 62 this square wave reference voltage enters a phase reversal stage 63 containing transistor T3, so that at 64, 65 two square wave voltages at 180 degrees from one another are obtained. The resistors, capacitors and connectors of the impulse former and phase reversal stages and connected circuits are shown in schematic form; they are well known and need not be described in detail. At 66 the reference potentials from 64, 65 are combined with (added to and subtracted from) the light signal voltages from 60, so that they, added to or subtracted from the square wave voltage for comparison, pass across diodes D3, D4. Selectively insertable capacitors 67 influence the integration constant of the comparing portion of the circuitry. In said portion, signals from diodes D3, D4 are compared in measuring instrument 68, which in this case lies in a modified bridge circuit with transistors T4, T5 and resistors R1, R2 for indicating the difference between said signals; transistors T3, T4 being employed to adapt the circuitry to the internal impedance of instrument 68. No claim is made herein to this circuitry or that of Figure 3, by itself; it is described only for the sake of complete statement of the cycling process and means, characterized by the novel shutter 11.

Modification of the invention is also possible in other respects, and particularly as to the rotary shutter. For instance Figure 5 shows a shutter on a shaft 70 transverse of beams A, B; the shutter having only a pair of vanes 71, 72 in lieu of the solid member 11' bounded by the corresponding surfaces 18, 19 as in Figure 2a. It will be noted that the duration of the interval of no light passage depends on the angle ϑ included between vanes 71, 72 and on the dimensions of the vanes, particularly radially of shaft 70, this latter dimension being shown at r.

It will further be noted that either type of rotary shutter, 11' or 71, 72, provides, in addition to the required in-phase programming of light pulses and no-pulse intervals, a very space-saving form of construction, a minimum of moment of inertia, and a corresponding possibility of minimizing diameters and distances of separated light beams A, B, whereby the entire apparatus 4 can be made desirably small, compact, and easy to move, together with a telescope or the like. While the device and its operation have been described with respect to the comparison of intensities of two trains of pulses of visible and otherwise unmodulated light from a remote target, it will be understood that various further modifications or modulations are possible, for instance by spectral absorption, polarisation and other effects, cyclically or non cyclically impressed on the light pulses or signals, which effects may be caused by the atmosphere between the telescope and the remote target and/or by other influences either natural or artificial.

I claim:

1. In a photometric device, a photosensitive element; means for directing different light beams onto said element for photo-electrical comparison of such light beams, a shaft having its axis transverse to said light beams, means to rotate said shaft continuously during operation of the device, and a light shutter on said shaft and in the path of said light beams, said shutter being comprised of an opaque cylindrical sector co-axial with said shaft and having radial boundary surfaces so dimensioned and angularly spaced for successively stopping either and both of said different light beams ahead of said photosensitive element during shutter rotation about said axis.

2. In a device for analyzing and comparing beams of light and the like, a photosensitive element; means for directing two such light beams onto said element for comparison, a shaft having its axis transverse to said light beams, means to rotate said shaft continuously during operation of the device, and a shutter on said shaft and in the path of said light beams, said shutter being comprised of an opaque cylindrical sector co-axial with said shaft and having radial boundary surfaces so dimensioned and angularly spaced for successively stopping one, both and then the other of said light beams ahead of said photosensitive element during shutter rotation about said axis.

3. In a photometric device, a photosensitive element, means for directing two parallel light beams onto said element for photoelectrical comparison of such light beams, a shutter arranged in the path of said light beams ahead of the photosensitive means and rotatable about an axis transverse to and midway between said light beams, said shutter being comprised of an opaque cylindrical sector co-axial with said axis and having radial boundary surfaces so dimensioned and angularly spaced as to stop successively one, both and then the other of said light beams during shutter rotation, and means to rotate said shutter about its axis continuously during operation of the device.

4. In a photometric device, a photosensitive element, means for directing two light beams onto said element for photoelectrical comparison of such light beams, a shaft having its axis transverse to said light beams, a shutter on said shaft in the path of said light beams ahead of the photosensitive means and rotatable with said shaft about an axis transverse to said light beams, said shutter being comprised of an opaque cylindrical sector having a diameter not substantially larger than the diameter of the said shaft and having radial boundary surfaces so dimensioned and angularly spaced as to stop successively one, both and then the other of said light beams during shaft rotation, and means to rotate said shaft continuously during operation of the device.

References Cited in the file of this patent
UNITED STATES PATENTS

| | | |
|---|---|---|
| 2,513,367 | Scott | July 4, 1950 |
| 2,675,488 | Bickley | Apr. 13, 1954 |
| 2,679,185 | Atwood | May 25, 1954 |
| 2,750,834 | Golay | June 19, 1956 |
| 2,803,752 | Warren | Aug. 20, 1957 |
| 2,829,275 | Golay | Apr. 1, 1958 |

OTHER REFERENCES

Whitford et al.: Review of Scientific Instruments, volume 8, March 1937, pages 78–82.